(12) United States Patent
Atkinson (10) Patent No.: US 11,794,889 B2
(45) Date of Patent: Oct. 24, 2023

(54) ROTORCRAFT

(71) Applicant: BAE Systems plc, London (GB)

(72) Inventor: David Charles Atkinson, Balderstone (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 17/922,994

(22) PCT Filed: Apr. 29, 2021

(86) PCT No.: PCT/GB2021/051033
§ 371 (c)(1),
(2) Date: Nov. 3, 2022

(87) PCT Pub. No.: WO2021/224593
PCT Pub. Date: Nov. 11, 2021

(65) Prior Publication Data
US 2023/0192281 A1 Jun. 22, 2023

(30) Foreign Application Priority Data

May 7, 2020 (EP) ..................................... 20275087
May 7, 2020 (GB) ..................................... 2006781

(51) Int. Cl.
*B64C 27/52* (2006.01)
*B64C 27/82* (2006.01)
*B64C 31/036* (2006.01)
*B64C 39/02* (2023.01)

(52) U.S. Cl.
CPC .............. *B64C 27/52* (2013.01); *B64C 27/82* (2013.01); *B64C 31/036* (2013.01); *B64C 39/026* (2013.01); *B64C 2027/8227* (2013.01)

(58) Field of Classification Search
CPC .. B64C 31/036; B64C 29/0033; B64C 31/028
See application file for complete search history.

(56) References Cited

U.S. PATENT DOCUMENTS

| 1,425,555 A | 8/1922 | Thompson |
| 10,589,838 B1 * | 3/2020 | Suppes ................. B64D 35/04 |
| 2006/0226281 A1 | 10/2006 | Walton |

(Continued)

FOREIGN PATENT DOCUMENTS

| DE | 102006019300 A1 | 10/2007 |
| DE | 102012202698 A1 | 8/2013 |

(Continued)

OTHER PUBLICATIONS

International Search Report and Written Opinion of PCT Application No. PCT/GB2021/051033, dated Jul. 21, 2021, 10 pages.

(Continued)

*Primary Examiner* — Tien Q Dinh
*Assistant Examiner* — William L Gmoser
(74) *Attorney, Agent, or Firm* — Maine Cernota & Curran (57) ABSTRACT

There is disclosed a rotorcraft comprising: an array of lift devices supported at a structure; a first group of the lift devices configured to generate thrust in a first common direction; a second group of the lift devices being tilted or tiltable relative to the first group of devices so as to generate thrust in at least a second common direction; and a flight control system.

19 Claims, 5 Drawing Sheets

(56) References Cited

U.S. PATENT DOCUMENTS

| | | |
|---|---|---|
| 2013/0020429 A1 | 1/2013 | Kroo |
| 2016/0291598 A1 | 10/2016 | Youmans |
| 2016/0311526 A1 | 10/2016 | Geise |
| 2018/0140933 A1 | 5/2018 | Chen |
| 2018/0148169 A1 | 5/2018 | Zhang et al. |
| 2018/0334251 A1 | 11/2018 | Karem |
| 2020/0140079 A1* | 5/2020 | Campbell ............... B64C 27/28 |
| 2020/0164976 A1* | 5/2020 | Lovering ............... B64U 70/80 |
| 2020/0164992 A1* | 5/2020 | Tamada ................. B64C 27/04 |
| 2021/0253234 A1* | 8/2021 | Tao .................... B64C 29/0025 |

FOREIGN PATENT DOCUMENTS

| | | |
|---|---|---|
| EP | 3176079 A1 | 6/2017 |
| EP | 3492377 A1 | 6/2019 |
| EP | 3611096 A1 | 2/2020 |
| FR | 2880615 A1 | 7/2006 |
| JP | H02114094 A | 4/1990 |
| KR | 1020160031602 A | 3/2016 |
| WO | 2007122245 A2 | 11/2007 |
| WO | 2019116101 A1 | 6/2019 |
| WO | 2019158943 A1 | 8/2019 |

OTHER PUBLICATIONS

Extended European Search Report for Appl. No. EP 20275087.3 dated Oct. 27, 2020, 7 pages.

Great Britain Search Report for Appl. No. GB 2006781.5 dated Sep. 23, 2020, 3 pages.

International Search Report and Written Opinion of PCT Application No. PCT/GB2021/051034, dated Jul. 9, 2021, 10 pages.

Extended European Search Report for Appl. No. EP 20275086.5 dated Oct. 29, 2020, 9 pages.

Great Britain Search Report for Appl. No. GB 2006780.7 dated Sep. 25, 2020, 4 pages.

* cited by examiner

ROTORCRAFT

RELATED APPLICATIONS

This application is a national phase application filed under 35 USC § 371 of PCT Application No. PCT/GB2021/051033 with an International filing date of Apr. 29, 2021, which claims priority of GB Patent Application 2006781.5 filed on May 7, 2020 and EP Patent Application 20275087.3 filed on May 7, 2020. Each of these applications is herein incorporated by reference in its entirety for all purposes.

FIELD

The present disclosure relates to a rotorcraft.

BACKGROUND

Rotorcraft can comprise an array of lift devices, such as rotary fans driven by electric motors, supported in fixed relation to one another on a rigid frame structure. Typically such rotorcraft have the lift devices arranged in the same horizontal plane.

Where the lift devices are rotary fans, some lift devices spin clockwise and others spin anti-clockwise.

By varying the rate of spin between the clockwise group and the anti-clockwise group, yaw can be controlled.

Further, such rotorcraft can control pitch and roll by varying the air displaced by backward devices relative to forward devices, and varying the air displaced by port devices relative to starboard device.

SUMMARY

According to a first aspect of the invention there is provided a rotorcraft comprising: an array of lift devices supported at a structure; a first group of the lift devices configured to generate thrust in a first common direction; a second group of the lift devices being tilted or tiltable relative to the first group of devices so as to generate thrust in at least a second common direction; and a flight control system.

Each of the lift devices may be individually tiltable.

The lift devices in the second group may be configured to tilt in concert.

The second group of lift devices may be tiltable relative to the first group and the structure may comprise: a main portion for housing the first group of lift devices; a tiltable portion for housing the second group of lift devices; and an actuator for effecting or varying the tilt of the tiltable portion.

The rotorcraft may further comprise: a pilot housing for accommodating a pilot; and connecting lines coupling the pilot housing to the rotorcraft structure.

The actuator my comprise: at least one steering line connected at a first end to the tiltable portion or the structure, the second end terminating towards or at the pilot housing, wherein the steering line may be tensioned to effect the tilt.

The tiltable portion may be biased to return to a particular arrangement relative to the main portion.

The actuator may comprise an onboard tilt actuator at the structure for driving the tilt between the main portion and the tiltable portion.

The rotorcraft may further comprise a communications module at the flight control system; wherein the communications module is operable to wirelessly receive flight control instructions from a pilot console.

The rotorcraft may further comprise an electrical power source.

The electrical power source may comprise: a fuel tank; and a generator device coupled to the structure.

The generator may produce an exhaust which is configured to generate thrust at a substantial inclination to the first common direction.

The second group of lift devices may comprise: a first sub-group of lift devices arranged to tilt in concert relative to the first group; and a second sub-group of lift devices arranged to tilt in concert relative to the first group and independently of the first sub-group of lift devices.

The thrust which may be generated by the first group of lift devices is from 150% to 300% of the thrust which may be generated by the second group of devices.

The second group may be tiltable and the flight control system may be configured to adjust the thrust of the first group to maintain a desired overall lift force for the rotorcraft.

BRIEF DESCRIPTION OF THE DRAWINGS

Examples of the present disclosure will now be described with reference to the accompanying drawings, in which.

DETAILED DESCRIPTION

It will be appreciated that relative terms such as top and bottom, upper and lower, and so on, are used merely for ease of reference to the Figures, and these terms are not limiting as such, and any two differing directions or positions and so on may be implemented.

Figure 1A:
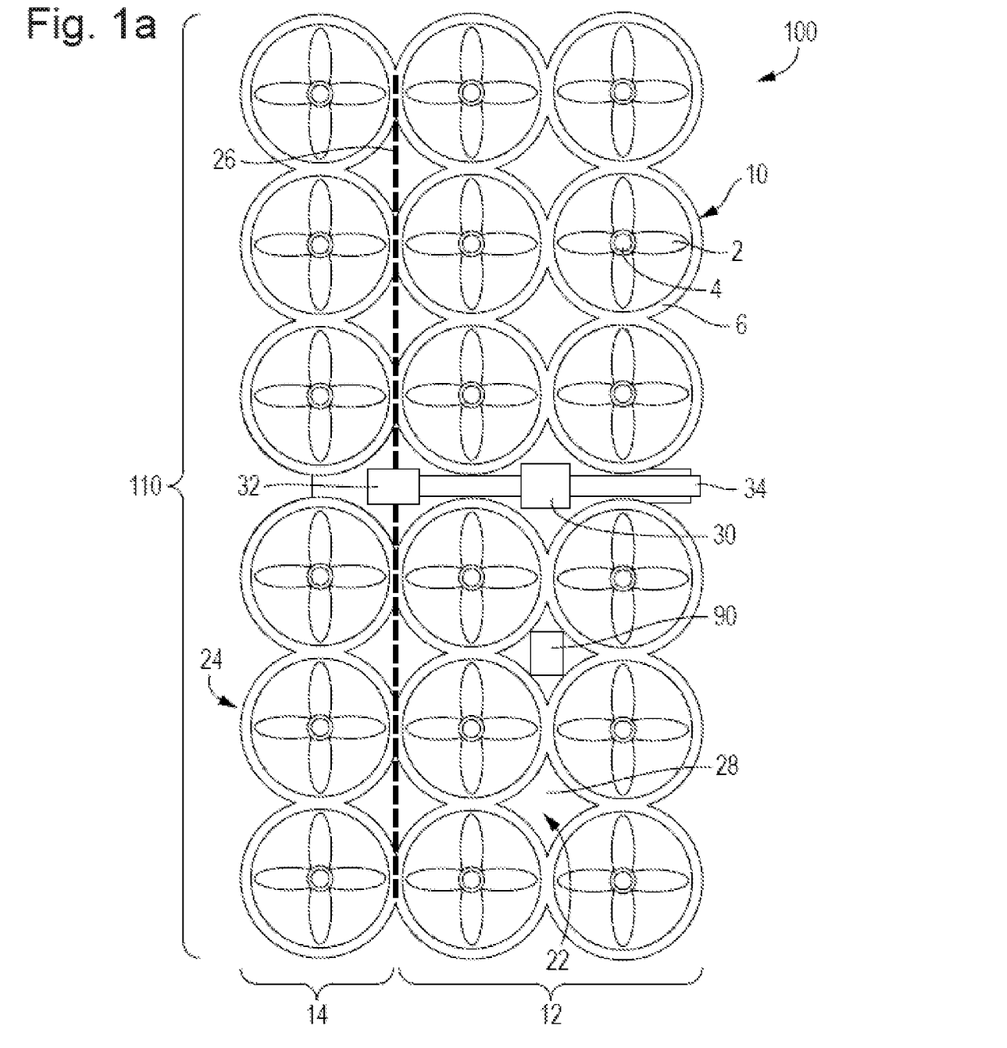
FIGS. 1a and 1b show a first embodiment of a rotorcraft, from first and second views respectively, and in an untilted condition.
Figure 1B:
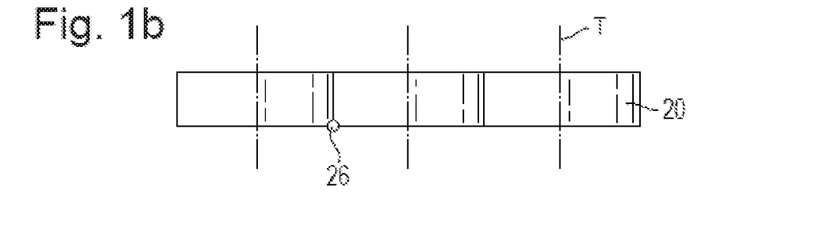

Referring to FIGS. 1a and 1b there is shown a rotorcraft 100, in top view and side view respectively.

The rotorcraft 100 comprises an array 110 of eighteen lift devices 10 supported at a frame structure 20. Further, rotorcraft 100 comprises a generator engine unit 30 and a flight control system 90.

Lift devices 10 are in the form of an electrically driven fan and as such comprise an electrical motor 4 about the spindle of which are mounted equally spaced fan blades 2. A protective shroud 6 surrounds the periphery of the blades, beyond the swept volume. Each lift device defines a main thrust axis T. Each lift device 10 is operable to output the same maximum thrust (i.e. maximum fan speed) but their thrust can be varied independently of other lift devices.

The generator engine unit 30 is a fuel burning engine which is in fluid communication with an onboard fuel tank 32. The generator engine unit 30 comprises an exhaust section 34 which is arranged to exhaust combustion by products along an axis which is generally perpendicular to the main thrust axis T, and can thereby propel the rotorcraft forwards, or leftwards with respect to the Figures page.

The frame structure 20 supports the eighteen lift devices 10 such that they are in a 3×6 matrix and in a substantially coplanar condition. Thus the lift devices can create a thrust in a common direction, along their respective T axes.

The frame structure 20 defines interstitial structure 28 between lift devices. These can be used to house or locate components such as the flight control system 90.

The frame structure 20 further comprises a main portion 22 that houses the back two rows of lift devices (i.e. a 2×6 matrix). Thus a first group 12 of lift devices is defined.

Further, the frame structure 20 comprises a tiltable portion 24 that houses the front row of lift devices (i.e. a 1×6 matrix). Thus a second group 14 of lift devices is defined.

Thus with all lift devices 10 in the array 110 operating with the same fan velocity, the thrust from the first group will be double that of the second group. In practice the first group may generate 150% to 300% of the thrust of the second group when cruising or when all fans in the array are at their maximum output. There may be variations between the port side and starboard side thrust of the first group to control direction and for trim.

The main portion 22 and the tiltable portion 24 are pivotally coupled by a hinge 26 that, for rotorcraft 100, runs across the lower side of the structure 20 from port side to starboard side.

The hinge 26 permits the rotation or tilt of the tiltable section 24 such that the condition of rotorcraft 100 can vary from the condition of FIGS. 1a and 1b where all lift devices are substantially coplanar. An onboard actuator 40 (see FIG. 2a) is provided for driving the rotation.

Figure 2A:
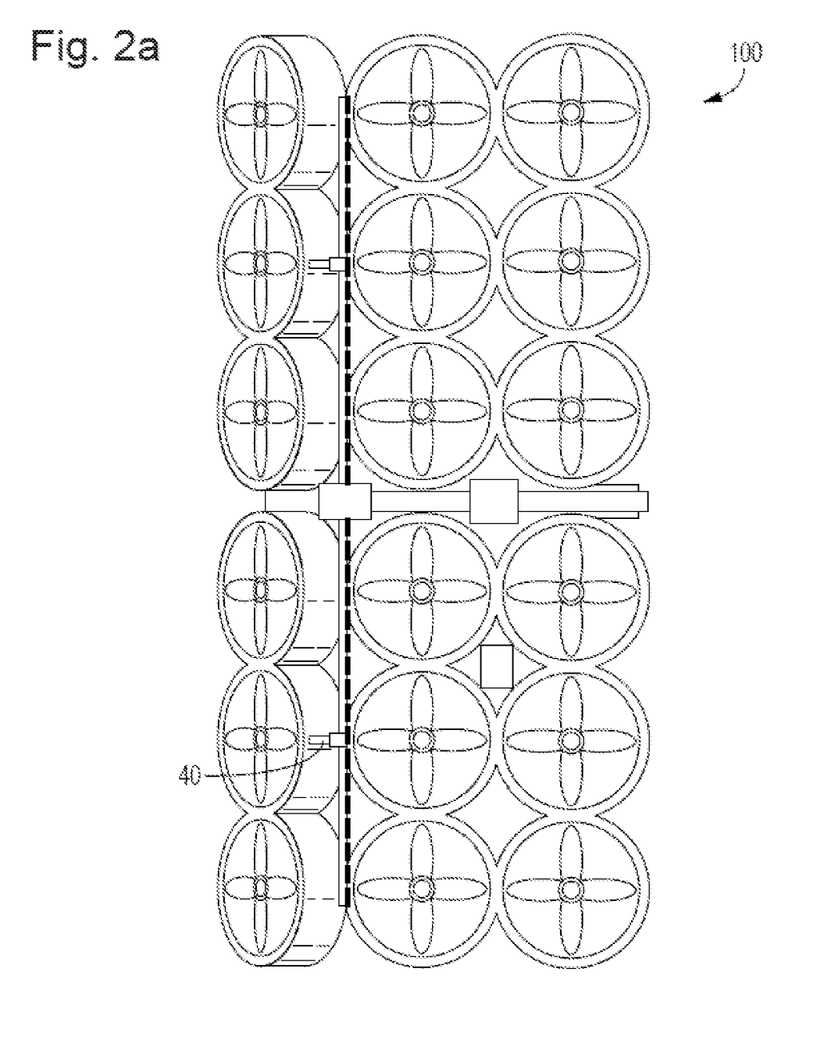
FIGS. 2a and 2b show the first embodiment of a rotorcraft, from first and second views, and in a tilted condition.
Figure 2B:
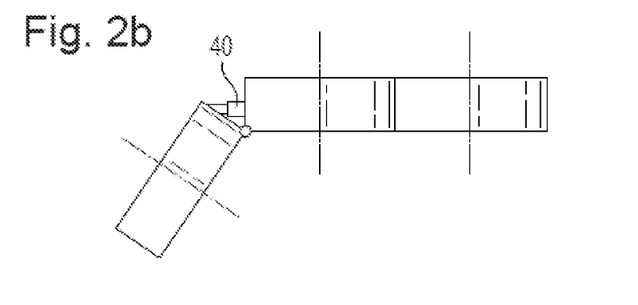

A further condition in which the rotorcraft 100 can exist is shown in FIGS. 2a and 2b. Here, the onboard tilt actuator 40 has driven the tiltable portion 24 to rotate about the hinge 26 by approximately 60 degrees. Thus the second group of lift devices have been tilted in concert.

As such, the tiltable portion 24 can generate thrust in a second common direction, where a component of the thrust generated by the second group of lift devices 14 will tend to accelerate the rotorcraft in a forward direction, or leftwards as shown on the Figures page.

Accordingly, in operation the rotorcraft 100 can vary the amount of tilt of the tiltable portion relative to the main portion and thereby move forward.

As the tiltable portion tilts and a component of the thrust provides increasing forward effect, the overall lift of the rotorcraft will tend to be reduced. As such, the flight control system 90 is configured to vary the fan velocity of the array of lift devices to maintain a constant lift force as the tiltable portion rotates.

Figure 3:
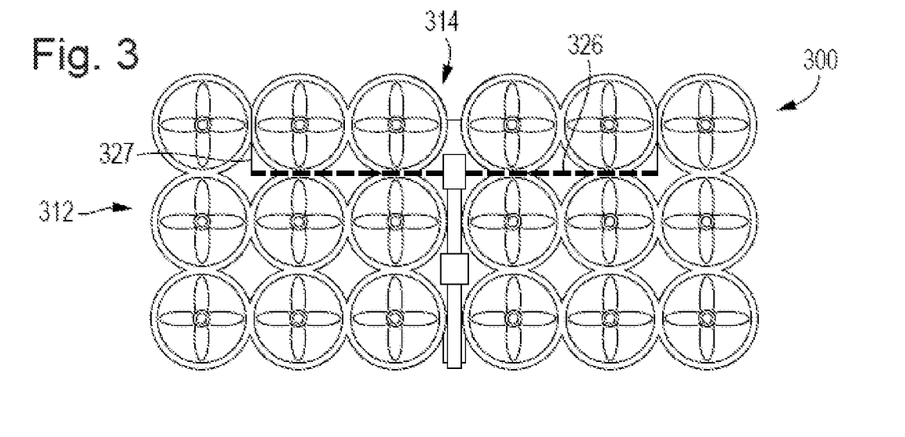
FIG. 3 shows a second embodiment of a rotorcraft.

A second rotorcraft 300 is shown in FIG. 3 that, like rotorcraft 100, has an array of lift devices 10 in a 3×6 matrix. In second rotorcraft 300, only a portion of the front row of the array is configured as the tiltable portion 314. Accordingly, the hinge 326 runs across a portion of the structure but not all the way across. Further, discontinuities 327 are provided to permit the lift devices 10 in the tiltable portion 314 to move relative the lift devices 10 of the main portion 312.

Figure 4:
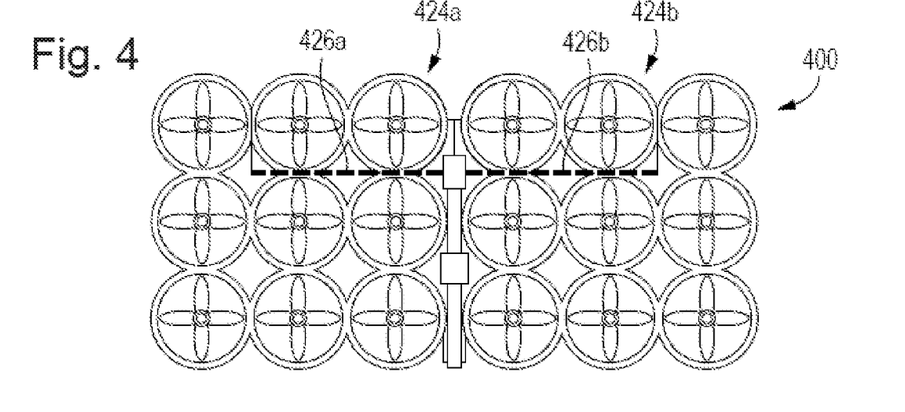
FIG. 4 shows a third embodiment of a rotorcraft.

A third rotorcraft 400 is shown in FIG. 4. Here the tiltable portion comprises a first tiltable portion 424a and a second tiltable portion 424b, each thereby defining a first sub-group and a second sub-group of lift devices. Each is provided with its own hinge (426a and 426b respectively) and onboard actuator (not shown). As such the first and second tiltable portions are tiltable independently of each other.

Further, the first tiltable portion 424a is generally to the port side of the rotorcraft 400, and the second tiltable portion 424b is generally to the starboard side of the rotorcraft. Thus, the yaw of the rotorcraft may be controlled by creating a differential between the amount of tilt between the first 424a and second 424b tiltable sections.

Whilst the rotorcraft 100, 300 and 400 discussed so far have in common the 3×6 matrix of lift devices 10, other configurations of lift devices are contemplated.

Figure 5:
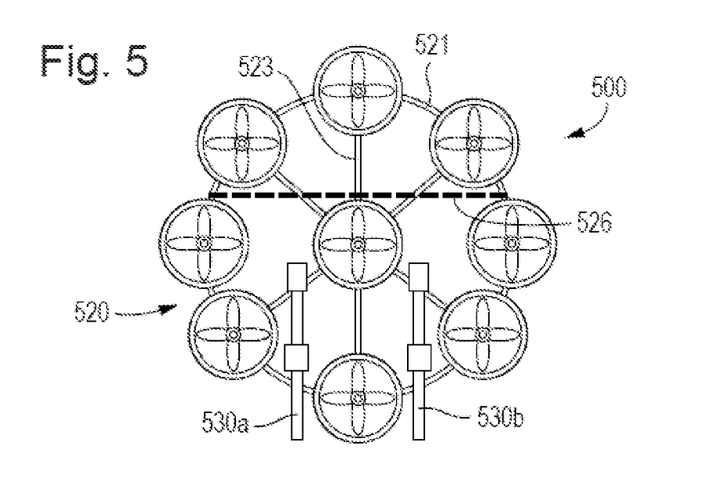
FIG. 5 shows a fourth embodiment of a rotorcraft.

FIG. 5 shows a fourth rotorcraft 500 comprising a circular frame structure 520 which supports a single lift device at its centre and eight further lift devices at a peripheral ring 521. The circular frame structure comprises spokes 523 connecting the peripheral ring 521 to the central lift device. The tiltable portion of the structure houses the front most three lift devices supported at the peripheral ring. A hinge 526 pivotally couples portions of the peripheral ring 521 and portions of the front most three spokes.

Two generator engine units 530a and 530b are provided at the frame structure 520 either side of the rearmost lift device.

Figure 6A:
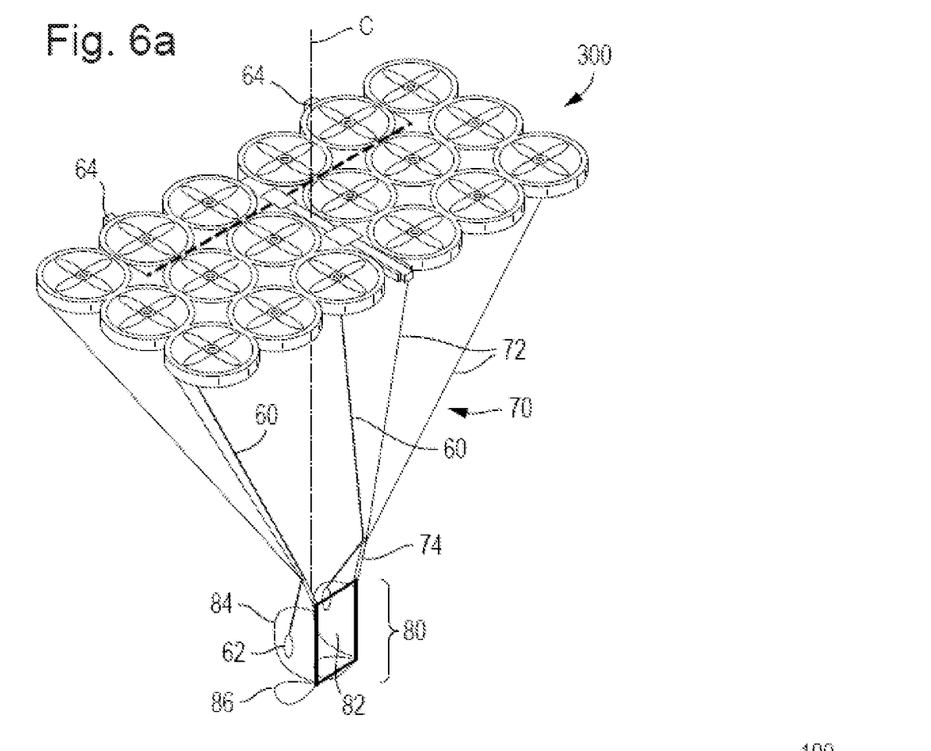
FIG. 6a shows an adaptation of the third embodiment of a rotorcraft.
Figure 6B:
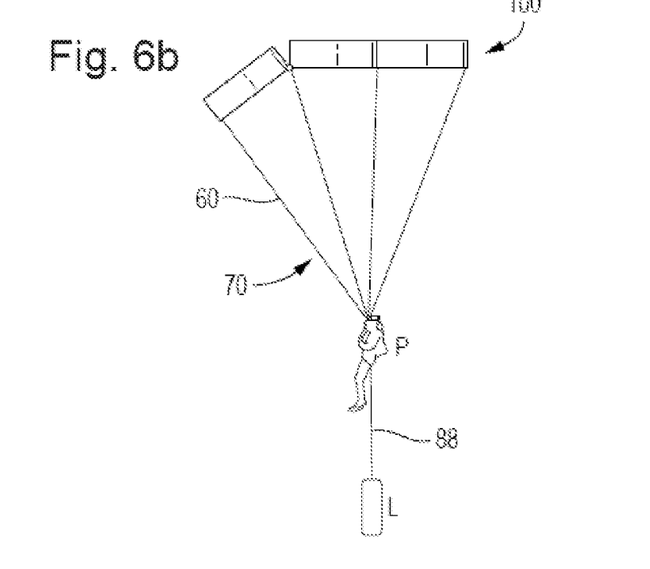
FIG. 6b shows an adaptation of the first embodiment.

An adaptation of the rotorcraft is shown in FIGS. 6a and 6b.

In particular in FIG. 6a, the rotorcraft, which as shown here is the second embodiment rotorcraft 300, further comprises a pilot housing 80 and connecting lines attaching the pilot housing 80 to the rotorcraft 300.

The pilot housing 80 comprises a back frame 82 for securely accommodating the back of a pilot, arm loops 84 for securely accommodating the arms of a pilot, and leg loops 86 for securely accommodating the legs of a pilot. Further cross-straps between loops may be provided (not shown).

The connecting lines 70 comprise a riser 74 and a pair of top lines 72 for each side of the rotorcraft. A starboard riser 74 is connected at its first end to the pilot housing and extends to meet, at its second end, the first end of the starboard top lines 74. The starboard top lines 74 then extend to connect, at their second ends, to respective attachment points on the foremost and aft most lift devices on the starboard side of the array. A port riser and port top lines extend in an equivalent manner between the pilot housing and the port most back and frond lift devices of the array.

The connecting lines 70 are flexible and generally inextensible and the port and starboard sides are of substantially equal length. As such the pilot housing tends to hang directly below the centroid axis C of the rotorcraft, when the rotorcraft is horizontal.

The connecting lines 70 and steering lines pivotally affix to the frame structure or pilot housing. In particular there may be a lug provided at the frame structure or pilot housing into which a karabiner at the end of the lines 60 or 70 can interlock.

Further provided are a pair of steering lines 60, one for the port side and one for the starboard side. Each steering line 60 attaches at its first end 64 to the tiltable portion of the frame structure. The starboard steering line 60 attaches to the frame at the foremost starboard lift device. The port steering line 60 attaches to the frame at the foremost port lift device. The second end of the steering lines 60 connect to a respective handle 62 and is configured to be proximate to the pilot housing such that a housed pilot can reach the handles 62. As shown, the steering lines 60 are routed via the second end of the risers 74 so as to tether the steering lines 60 and to tend to provide them at the pilot housing. The routing of the steering lines 60 at their respective risers 74 is such that the steering line can slide relative to the riser 74.

The steering lines 60 are flexible and generally inextensible and as such drawing the handles 62 away from the array of lift devices will tend to tilt the tiltable portion of the frame structure. Any onboard tilt actuators are configured to allow this. Further, the hinge may be sprung such that the tiltable portion is biased to assume the planar condition.

In FIG. 6b, an adaptation has been made to the first rotorcraft 100 whereby a pilot housing, housing pilot P, and connecting lines have been added. Here, the connecting lines comprise three top lines on either side and connect to the foremost, middle and aft most lift device in the main portion.

Further, an attachment line 88 extends between the pilot housing 80 and a payload L.

As an alternative to the steering lines 60 shown in FIGS. 6a and 6b, which directly actuate the tiltable portion, there may be provided a pilot console 50 at the pilot housing 80.

Such a pilot console 50 comprises an interface (e.g. buttons and joystick) whereby the pilot can input instructions, and an operable link to the flight control system so that such instructions can be understood and relayed to the onboard tilt actuator 40.

Figure 7:
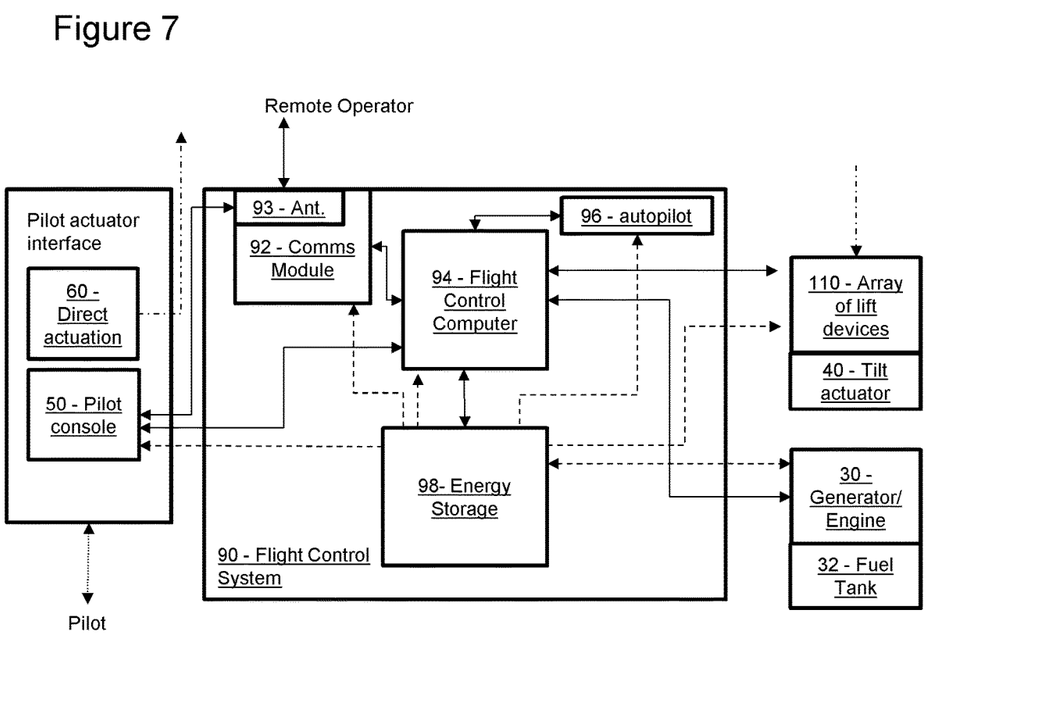
FIG. 7 shows a schematic diagram of a flight control system for a rotorcraft.

The flight control system 90, suitable for any of the preceding rotorcraft but particularly configured for the FIGS. 6a and 6b rotorcraft, comprises a flight control computer 94, a communications module 92, an autopilot 96, and an energy storage unit 98.

The energy storage unit 98 has the form of an electrical battery and is operable to supply electrical power (shown as a dashed line) to the flight control computer 94, the autopilot module 96, and the communications module 92. Further, the energy storage unit 98 is operable to supply power to components outside of the flight control system 90, namely the array 110 of lift devices and the onboard tilt actuator 40, the generator unit 30 and fuel tank 32, and the pilot console 50.

The energy storage module 96 is also operable to receive electrical power from the generator unit 30, which would tend to be the main operating condition of the system.

The combination of the energy storage unit 98 and the generator unit 30 can be considered as an electrical power source.

The flight control computer 94 is operably connected to other components such that it can receive input data and transmit output data (shown as a solid line) from and to such other components. Such data may be conveyed via wired links or wireless/RF links.

In particular, the flight control computer 94 can transmit to the array of lift devices 110 instructions on how the array is to configure itself moment to moment, for example what target fan speed each lift device should be set at. Such instructions could be broken down into instructions for each lift devices 10 in the array, delivered independently via a bus architecture on the rotorcraft. Data could also be fed back to the computer 94 e.g. the actual fan speeds achieved at each lift device 10; hence feedback algorithms at the computer 94 could regulate and control the lift devices in a dynamic environment.

Further, the onboard tilt actuator 40 can receive instructions from the flight control computer 94 which could pertain to the tilt that needed to be effected.

In particular, the flight control computer 94 can receive flight control instructions from the pilot console 50, and can transmit status reports (e.g. relating to fuel levels) to the pilot console 50. The pilot console 50 is arranged to convert pilot instructions (shown as the dotted line) into the machine-readable data (shown as the solid line), and to convert machine-readable status reports into pilot-readable information.

Further, the pilot console 50 shown here is operable to communicate wirelessly with the flight control system 90 and as such instructions from the console 50 may be relayed to the flight control computer 94 via the communications module 92. Such a module 92 is operable to convert the machine-readable wireless/RF signal into a machine-readable electrical signal suitable for feeding into the computer 94. The communications module 92 is provide with an antenna unit 93 for receiving and transmitting wireless RF signals.

The communications module 92 is also operable to communicate with a remote operator. The remote operator, once linked to the flight control system 90 by the communications module 92 is able to send and receive flight data and can thereby remotely pilot or monitor the rotorcraft.

The flight control computer 94 can also receive flight control input data from the autopilot 96, and if appropriate can feed back data to the autopilot 96.

Accordingly the rotorcraft can be controlled by the onboard pilot, the remote operator, or the autopilot 96. Further, the rotorcraft can be controlled by any combination of these where appropriate provisions for hierarchy of command are in place.

Also shown in FIG. 7 is the steering line 60, which illustrates that the array of lift devices 110 can be directly actuated (see the dot-dash line).

For rotorcraft without the adaptations shown in FIGS. 6a and 6b, the flight control system 90 can be simplified in so far as there is no local pilot. Accordingly, the pilot actuation methods of the steering line/direct actuation 60 and the pilot console 50 will not be present and can be absent. Such rotorcraft would tend to be controlled by the remote operator and/or the autopilot 96.

Figure 8:
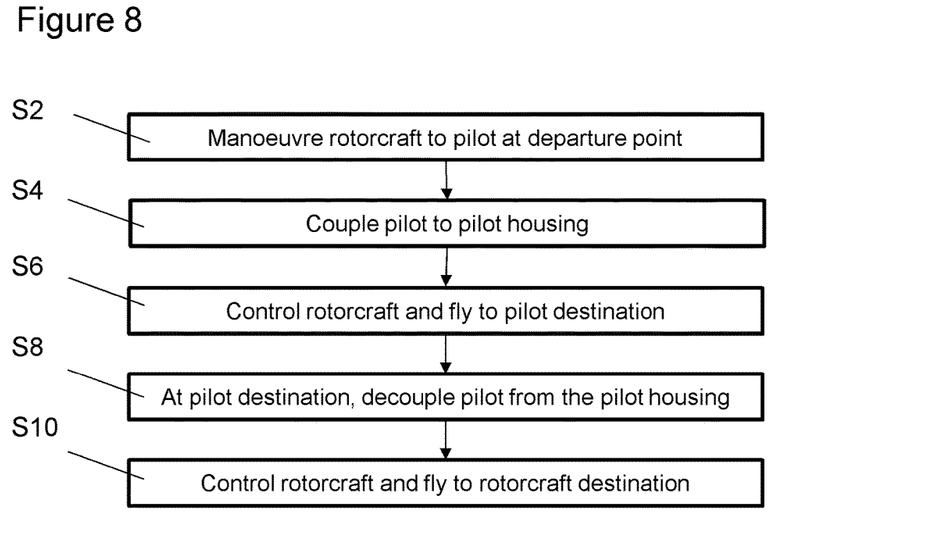
FIG. 8 shows a set of steps for using the rotorcraft of FIGS. 6a and 6b.

Referring to FIG. 8 there is shown a method of using a rotorcraft as shown in FIGS. 6a and 6b to deploy a pilot to a destination.

In step S2, the rotorcraft is manoeuvred to the pilot at a departure point location. Such manoeuvring would tend to involve the rotorcraft hovering at a height from the ground such that the pilot housing 80 is easily accessible by the pilot.

In step S4, the pilot is coupled into the pilot housing 80. Where the pilot housing 80 is of the harness type used by parachutists, the pilot will be familiar with the use and will be able to easily couple themselves to the housing 80 and hence the rotorcraft. An optional extra step at this point would be to further couple a payload L (e.g. the pilot's luggage or kit) to the housing 80.

In step S6, the pilot controls the rotorcraft for example by varying the tilt of the tiltable portion 24 of the array 110 (though the rotorcraft could alternatively be controlled by a remote operator, or the onboard autopilot, or combinations of all three) and flies the rotorcraft to the pilot's destination.

In step S8, with the pilot at the destination, the rotorcraft can hover at a suitable distance from the ground to allow the pilot to safely decouple from the pilot housing 80. Hence the pilot is deployed to their destination. If a payload L has been connected to the pilot housing 80, this can be decoupled here too.

Decoupling may involve removing the connecting lines 70 and any steering lines 60 and having the pilot look after them. Alternatively, after the pilot has decoupled from the rotorcraft, the frame structure 20 may reel in the lines 60, 70 and stow them safely in an interstitial space 28 for the onward flight.

In step S10 the rotorcraft is controlled and flown to the rotorcraft destination. Such control will tend to be done by the remote operator or the autopilot 96. The rotorcraft destination may be the departure point, or may be a third location.

The rotorcraft described herein provide an additional manoeuvre mechanism for rotorcraft. This can lead to a more energy efficient and/or faster travel in the direction of tilt. Hence the rotorcraft can tend to travel further for a given amount of energy.

Further, rotorcraft with the pilot adaptation can, as compared to other personnel transport devices such as parachutes and microlight aircraft, be provided to hover prior to carrying the personnel. This can be a safer or more convenient process.

Moreover, rotorcraft with the adaptation tend to provide that the pilot is a greater distance away from hazardous components such as the fan blade or generator and so is potentially safer. Further, provided the pilot is wearing an auxiliary parachute, then there is above a certain ceiling a safe mid-flight abandonment procedure whereby the pilot decouples from the housing and deploys their auxiliary parachute—with minimal risk of hitting the array of lift devices.

Still further rotorcraft with the adaptation provide a personnel deployment device which can be retrieved independently of the pilot and so can potentially be reused with a smaller turn around time, or can leave less trace of deployment, or can leave the pilot with a smaller mass to carry.

Various alternatives to and adaptations of components of the rotorcraft are contemplated. For example:

- The energy storage unit 98 may have the form of or comprise a Fuel cell, which could operate instead of or alongside the battery;
- Further, if the storage capacity of the fuel cell or battery was sufficient, the generator unit 30 may be absent; conversely, the generator unit 30 may be sufficient to obviate the need for the electrical energy storage unit 98;
- The 3×6 matrix arrangement of rotorcraft 100, 300 and 400 could be replaced by other matrix arrangements e.g. 5×5;
- The circular frame 520 arrangement of rotorcraft 500 could be replaced by an oval frame;
- There could be a portion of lift devices which are permanently set at a tilt relative to the main portion;
- All lift devices may be tiltable independent of one another, e.g. by way of each having an individually actuated gimballed mount, but nonetheless a group within the array may be electronically configured to tilt in concert whilst another group remains in their original orientation. Such tilt may be generally simultaneous and generally by the same degree;
- Where the exhaust of the generator unit 30 is used for thrust, moveable vents could be provided at the exhaust to further affect mobility;
- For the lift devices 10, as an alternative to fan lift devices there may be provided an array of airflow amplifier devices, which may harness the Coanda effect to effect thrust or lift.
- The flexible connecting lines 70 could be replaced with rigid stays;

The antenna unit 93 could be replaced by another form of sensor such as optical sensor, and thereby the communications module 92 would be able to communicate via e.g. line of sight optical signals.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A rotorcraft comprising:
   an array of lift devices supported at a structure, each of said lift devices comprising a shroud;
   a first group of the lift devices configured to generate thrust in a first common direction;
   a second group of the lift devices being tilted or tiltable relative to the first group of devices so as to generate thrust in at least a second common direction; and
   a flight control system;
   said structure comprising:
     a main portion for housing said first group of lift devices, wherein said shrouds of said first group of lift devices abut, forming main portion interstitial spaces;
     a tiltable portion for housing said second group of lift devices, wherein said shrouds of said second group of lift devices abut, forming tiltable portion interstitial spaces;
   wherein said main portion and said tiltable portion are pivotally coupled by a hinge that runs across a lower side of said structure from a port side to a starboard side, between said main portion and said tiltable portion of said structure; and
   wherein the flight control system is configured to adjust the thrust of the first group to maintain a desired overall lift force for the rotorcraft.

2. The rotorcraft according to claim 1 wherein a generator device coupled to the structure is located in said main portion interstitial spaces.

3. The rotorcraft according to claim 1 wherein the lift devices in the second group are configured to tilt in concert.

4. The rotorcraft according to claim 1 comprising an actuator for effecting or varying the tilt of the tiltable portion.

5. The rotorcraft according to claim 1 further comprising:
   a pilot housing for accommodating a pilot; and
   connecting lines coupling the pilot housing to the rotorcraft structure.

6. The rotorcraft according to claim 1 wherein an actuator comprises:
   at least one steering line connected at a first end to the tiltable portion or the structure, a second end terminating towards or at a pilot housing, wherein the steering line may be tensioned to effect the tilt.

7. The rotorcraft according to claim 1 wherein the tiltable portion is biased to return to a particular arrangement relative to the main portion.

8. The rotorcraft according to claim 4 wherein the actuator comprises an onboard tilt actuator at the structure for driving the tilt between the main portion and the tiltable portion.

9. The rotorcraft according to claim 5 further comprising:
   a communications module at the flight control system, wherein the communications module is operable to wirelessly receive flight control instructions from a pilot console.

10. The rotorcraft according to claim 1, further comprising an electrical power source.

11. The rotorcraft according to claim 1 wherein an electrical power source comprises:
a fuel tank; and
a generator device coupled to the structure.

12. The rotorcraft according to claim 11 wherein the generator produces an exhaust which is configured to generate thrust at a substantial inclination to the first common direction.

13. A rotorcraft comprising:
an array of lift devices supported at a structure, each of said lift devices comprising a shroud;
a first group of the lift devices configured to generate thrust in a first common direction;
a second group of the lift devices being tilted or tiltable relative to the first group of devices so as to generate thrust in at least a second common direction; and
a flight control system;
said structure comprising:
a main portion for housing said first group of lift devices, wherein said shrouds of said first group of lift devices abut, forming interstitial spaces;
a tiltable portion for housing said second group of lift devices, wherein said shrouds of said second group of lift devices abut, forming interstitial spaces;
wherein said main portion and said tiltable portion are pivotally coupled by a hinge that runs across a lower side of said structure, between said main portion and said tiltable portion of said structure; and
wherein the flight control system is configured to adjust the thrust of the first group to maintain a desired overall lift force for the rotorcraft;
wherein the second group of lift devices comprises:
a first sub-group of lift devices arranged to tilt in concert relative to the first group; and
a second sub-group of lift devices arranged to tilt in concert relative to the first group and independently of the first sub-group of lift devices.

14. The rotorcraft according to claim 1 wherein the thrust which may be generated by the first group of lift devices is from 150% to 300% of the thrust which may be generated by the second group of devices.

15. A rotorcraft comprising:
an array of lift devices supported at a structure, each of said lift devices comprising a shroud;
a first group of said lift devices configured to generate thrust in a first common direction; and
a second group of said lift devices being tilted or tiltable relative to said first group of devices so as to generate thrust in at least a second common direction;
said structure comprising:
a main portion for housing said first group of lift devices, wherein said shrouds of said first group of lift devices abut, forming main portion interstitial spaces;
a tiltable portion for housing said second group of lift devices, wherein said shrouds of said second group of lift devices abut, forming tiltable portion interstitial spaces;
wherein said main portion and said tiltable portion are pivotally coupled by a hinge that runs across a lower side of said structure from a port side to a starboard side, between said main portion and said tiltable portion of said structure.

16. The rotorcraft according to claim 15 wherein a generator is located in said main portion interstitial spaces.

17. The rotorcraft according to claim 15 wherein an exhaust section is located in said main portion interstitial spaces.

18. The rotorcraft according to claim 15 wherein a fuel tank is located in interstitial spaces between said main portion interstitial spaces and said tiltable portion interstitial spaces.

19. The rotorcraft according to claim 15 wherein said hinge extends across only a portion of said structure, not completely across.

\* \* \* \* \*